Feb. 1, 1955    K. W. HOWE ET AL    2,700,953
COATING DEVICE FOR FRUITS AND VEGETABLES
Filed June 24, 1952    3 Sheets-Sheet 1
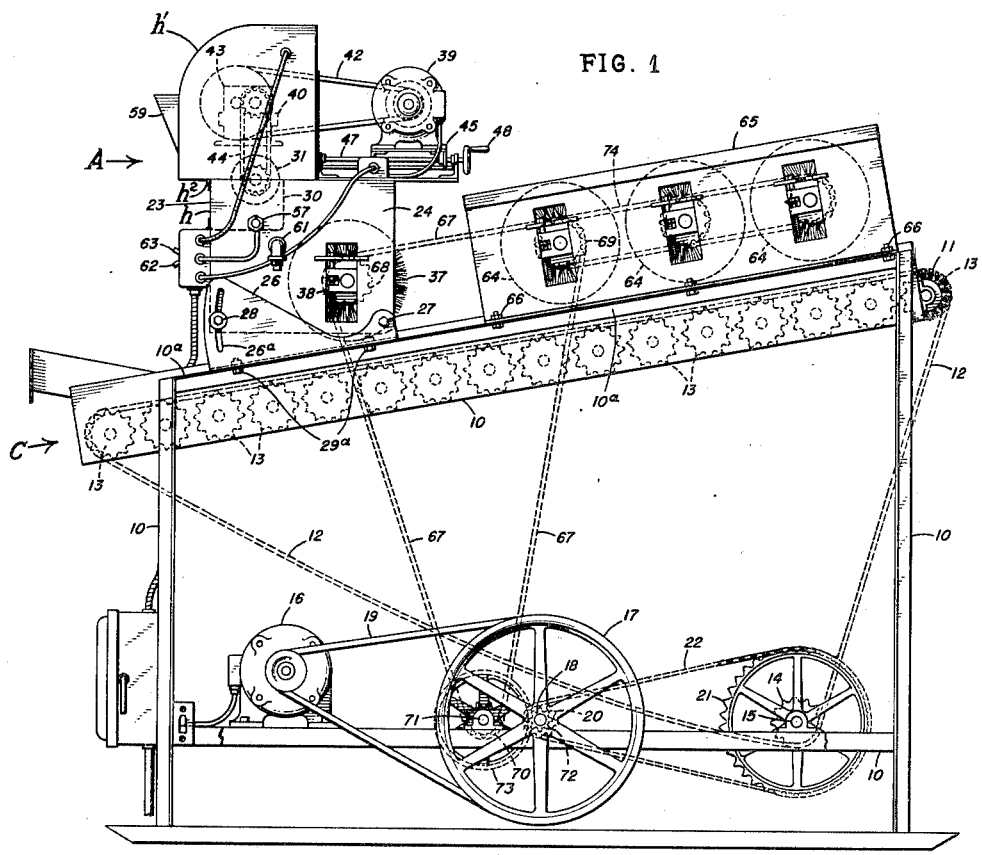
FIG. 1
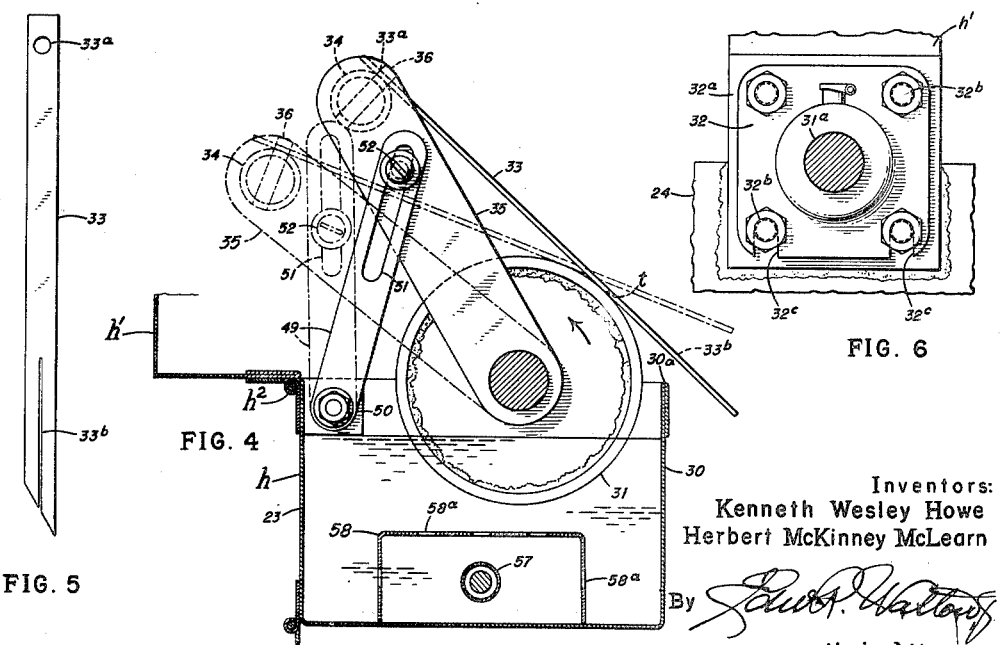
FIG. 4
FIG. 5
FIG. 6
Inventors:
Kenneth Wesley Howe
Herbert McKinney McLearn
By
their Attorney

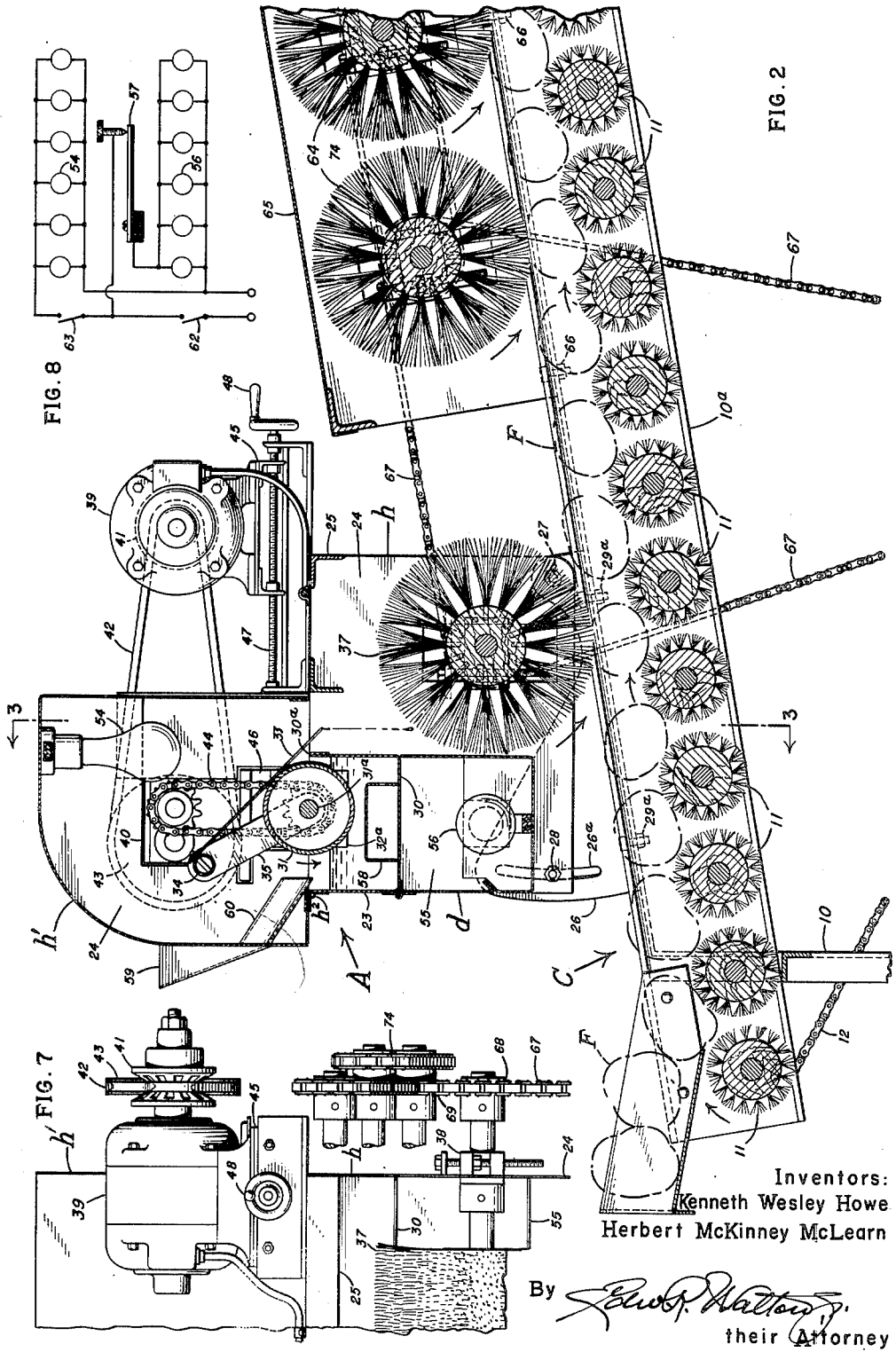

Feb. 1, 1955 K. W. HOWE ET AL 2,700,953
COATING DEVICE FOR FRUITS AND VEGETABLES
Filed June 24, 1952 3 Sheets-Sheet 3
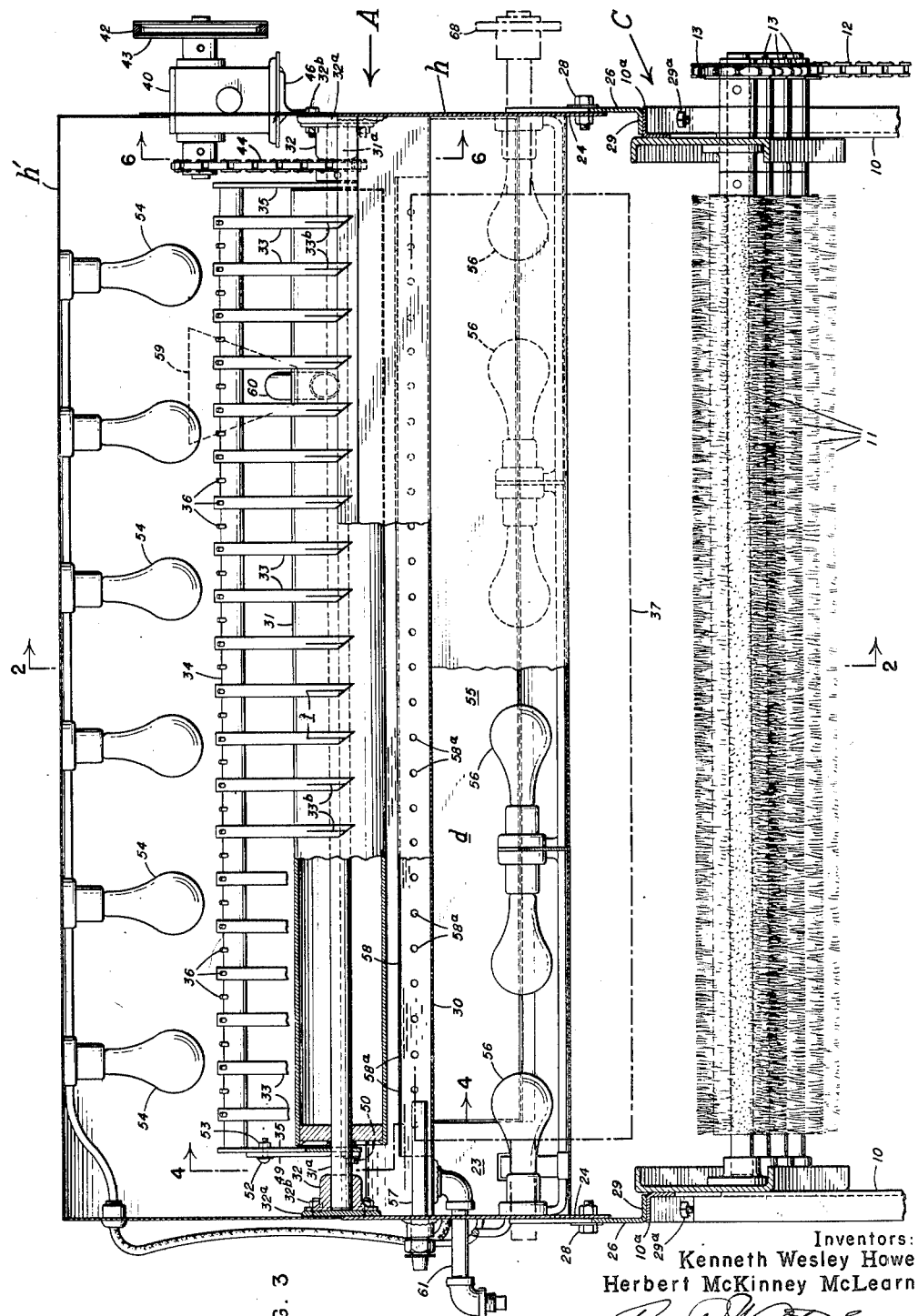
FIG. 3
Inventors:
Kenneth Wesley Howe
Herbert McKinney McLearn
By 
their Attorney United States Patent Office 2,700,953
Patented Feb. 1, 1955

2,700,953

COATING DEVICE FOR FRUITS AND VEGETABLES

Kenneth Wesley Howe, Orlando, and Herbert McKinney McLearn, Maitland, Fla., assignors to American Machinery Corporation, Orlando, Fla., a corporation of Florida Application June 24, 1952, Serial No. 295,172

15 Claims. (Cl. 118—18)

The present invention relates to improvements in apparatus for applying coatings, such as wax and the like, to fruits and vegetables, but which may have other uses.

It has long been the practice to wash fruits and vegetables after they have been picked and brought from the field for packaging or crating prior to their shipment to the market. This washing is frequently done with rotating brushes to remove dirt, mould or other foreign substances adhering to the skin of the product and irrespective of what methods are employed, at least some of the natural wax is removed from the surface of the product, which wax protects the product from spoiling too quickly or losing its moisture content.

It has been the practice in the treating of fruits and vegetables for the market to apply a wax coating (usually a wax-emulsion) to fruits and vegetables, and particularly to replace any natural wax that has been removed as by washing, for the purpose of reducing the time element of spoilage as well as to prevent loss of the natural moisture from the product, which latter is referred to in the art as "shrinkage control."

Numerous devices and methods have been proposed for accomplishing the application of this wax or wax-like coatings to the edible product. These prior devices and methods, while operating for the most part in a satisfactory manner, have numerous drawbacks among which, and the most important, is that usually too much wax is applied to the product and no satisfactory solution has been heretofore suggested for the control of the application of the wax. This excess distribution of the wax results in an economic loss of wax as well as requiring frequent cleaning of the machinery, cleaning or renewal of brushes or rollers of the applicator or of the conveyor bed brushes to remove gummy or hardened wax therefrom and also results in too much wax upon the product, giving it a sticky or gummy feel and making it difficult to polish and causing a generally unsatisfactory appearance of the product.

The drawbacks or disadvantages just mentioned have been experienced, especially, in connection with the application of an unemulsified waxy material or wax concentrates of relatively high viscosity and, particularly, with certain of these waxes which stiffen or solidify at atmospheric temperatures between 80° F. and 90° F. and which are most suitable for certain types of fruits and vegetables by having greater spreading characteristics and giving a greater luster and shrinkage control than previously known wax coatings. The facilities available in the prior art, for applying wax coating to the edible products, are not suitable or satisfactory for applying the wax just mentioned because, in addition to the drawbacks above noted, they cannot be controlled to deliver the wax in quantities minute enough in a given space of time to properly and satisfactorily coat the edible products.

In view of the shortcomings of the prior art, briefly stated above, it is the general object of the invention, broadly stated, to provide means—particularly in a device for applying a protective and/or decorative coating to farm produce such as fruits or vegetables—for accurately metering the delivery of the coating medium to the medium-applying component of the mechanism of said device, said metering or delivery means being adjustable in large steps to suit approximately the requirements of widely disparate classes of articles or produce, and minutely adjustable over an adequate range to suit the more local requirements of a given batch of produce, as well as to compensate for changes in viscosity of the protective and polishing medium caused by such influence as local variations in the room temperature or in the composition of the applied medium.

It is also an object of the present invention to provide a waxing applicator for fruits and vegetables that will supply a viscous waxy material, which solidifies at temperatures below 90° F., in a condition and in such minute quantities as to effect full shrinkage and spoilage control while giving a most satisfactory and acceptable appearance to edible products and which applicator is quickly adjustable within a fraction of a second to vary the quantity of the wax delivered, thus rendering wax-applicators more efficient.

The above stated objects, and others that will appear as the specification proceeds, are accomplished, in accordance with the preferred embodiment of the invention as now devised, by a unitary structure including a smooth surface rotating drum in a tank or trough of wax, in liquid form, a plurality of drip-finger strips tangentially disposed with respect to the rotating drum and positioned in a generally vertically inclined position so that the wax is carried by the drum upwardly under said fingers, said fingers having longitudinal slots or kerfs therein extending from the lower ends of the fingers to at least the point of contact of the fingers with the drum, the lower ends of said fingers overlying a rotating applicator brush adapted to be positioned above an underlying conveyor bed that advances the edible product therealong and in contact with said applicator brush.

Other features of the invention reside in means for automatically maintaining the wax material at a temperature within the trough, while on the drum and on said fingers, in its liquid state to assure its flowability; and, also, resides in means for changing the angularity of said finger strips in relation to the drum so as to regulate the amount of wax covering material delivered by the fingers to the applicating member; and, further, resides in means for controlling the speed of the drum and the speed of the applicator.

The invention will be understood best from the following description of the specific embodiment in which it is now actually used and of which the organization and combination of parts, and the details of construction thereof, are more fully described and pointed out in the appended claims.

The accompanying drawings, which by reference form part of this specification, show the preferred embodiment of the invention as at present devised and in actual use, although it is to be understood that the showing herein is by way of example and is susceptible to many changes and modifications that fall within the spirit of the present invention and the scope of the appended claims.

In the drawings:

Figure 1 is a side elevation of a conveying apparatus, preferably, having a conveyor bed composed of a plurality of rotatable transverse brushes, and having the wax-applicator device mounted thereon.

Figure 2 is an enlarged longitudinal vertical sectional view taken through the wax-applicator device and a portion of the bed of said conveying apparatus as shown in Figure 1 and substantially on line 2—2 of Figure 3;

Figure 3 is an enlarged vertical sectional view taken transversely through the wax-applicator and the conveyor bed substantially on line 3—3 of Figure 3;

Figure 4 is a fragmentary vertical sectional view taken substantially on line 4—4 of Figure 3 showing the means and manner of adjusting the position of the wax-distributing fingers;

Figure 5 is a top view of one of said distributing fingers;

Figure 6 is a face view of one of the bearings for mounting the pick-up drum of the applicator and is taken substantially on line 6—6 of Figure 3;

Figure 7 is a fragmentary elevation showing the location of the pick-up drum driving motor with relation to the applicator housing as viewed from the right of Figures 1 and 2 and, further, showing sprocket chain arrangement for driving the applicator-brush and polishing brushes; and Figure 8 is a wiring diagram of the arrangement for thermostatically controlling the heating means for maintaining the fluidity of the wax within the applicator.

Referring specifically to said drawings, in which like characters of reference indicate similar and like parts throughout the several views, A denotes the applicator of the present invention which is, preferably, an independent unitary structure that may be readily mounted upon or moved from any desired article-treating machine C capable of receiving and conveying therethrough the articles, to be treated.

Such a treating machine is here shown as a, so-called, transverse brush conveyor C, comprising a table-like frame 10 having journalled at its top a plurality of cylinder brushes 11 arranged in close, but slightly spaced, parallel relation to form a generally horizontal conveyor bed, as is well known in the art, for advancing, as well as brushing, the articles from one end thereof to the other end, the said bed being preferably inclined upwardly from its receiving end to its discharge end at the rate of one inch elevation for each linear foot of length. It is common practice, in transverse brush or roller bed type conveyors, for the brushes 11 to be driven by a sprocket chain 12, engaging sprockets 13 fast to the brushes or roller 11, driving them in the same direction to feed the articles or produce thereon along the length of the bed. The sprocket chain 12 is driven from a sprocket wheel 14 fast on the shaft 15 journalled on the frame 10 below the brush bed 11. The shaft 15 is driven by a motor 16 through a reduction drive-means which may comprise a large pulley 17 fast on a shaft 18, journalled on the frame 10, and connected with the motor shaft by a belt 19, and a small sprocket 20 fast on shaft 18 having a drive connection with a larger sprocket 21 on shaft 15 through sprocket chain 22.

The applicator of the present invention employs, preferably, a rectangular box-like casing *h* of sheet metal or like material providing a housing and support for the instrumentalities disposed therein and thereon and has a side or front wall 23 and two end walls 24 connected at their upper rear corner portions by a right-angular member 25 whose flanges extend horizontally and vertically, respectively, as shown. A supporting base 26 is provided on the lower portion of each end wall 24 of the casing and is designed to rest upon and be removably secured to the top of the usual sideframe pieces 10ª of the conveyor C so as to position the applicator transversely of and overlying said conveyor, preferably, at a point adjacent the intake end thereof, said bases being adjustable about a horizontal axis to allow leveling of the applicator irrespective of the degree of inclination given the conveyor bed. The bases 26 are here shown as segmentally-shaped plates substantially parallel with said end walls and having their smaller ends pivotally mounted, as at 27, to the end walls 24 at the rear lower corner portions of said end walls, respectively (see Figures 1 and 2). The other end portion of each plate 26 has an arcuate slot 26ª therein concentric with the pivot 27 and through which extends a binding fastener 28, such as the headed-bolt threaded in the adjacent end walls 24 of the housing. The lower marginal edge portion of each plate 26 is bent at right angles thereto to provide feet 29 to rest upon the frame pieces 10ª and to be removably secured by bolts 29ª.

The casing or housing *h* has disposed therein, along the length of the upper portion of its front wall 23, an elongated wax tank or trough 30 open on its top-side and adapted to contain a quantity of wax or other like materials to be applied to the fruits or vegetables, or other articles, F being advanced thereunder on the conveyor bed 11. The wax or coating material is withdrawn from the tank 30 by an overlying rotatable drum or cylinder 31 journalled at its shaft ends 31ª in journal bearing 32 removably mounted on bracket plates 32ª secured to the end wall 24 of the housing *h*. The bearings 32 are secured to the bracket plates 32ª by bolts 32ᵇ, the bearings having at least two spaced bottom edge slots or notches 32ᶜ to receive and slip-over the shanks of two of said bolts to permit easy insertion and alignment of the bearings and to support the drum shaft 31ª in aligned position while the bolts are being tightened. The bearings 32 are located so as to support the drum 31 with its lower peripheral portion extending into the tank for a distance below the normal liquid level of the wax within said tank, the upper peripheral portion of the drum or cylinder 31 extending, preferably, above the upper open top-side of the tank. The drum 31 may be of any suitable material that has an even and smooth outer circumferential surface adapted to pick up a film of liquid wax on such surface as the drum is rotated.

The prime desideratum in wax applicators, particularly for fruits and vegetables, has been the transfer and distribution of the wax from the tank to the articles, to be coated or treated therewith, in quantities that can be finely and accurately controlled. By the provision of a plurality of fingers 33 of relatively flat thin strip material disposed tangentially to and in contact with the drum 31 and with their lower ends extending or inclining downwardly and being kerfed or slotted longitudinally at 33ᵇ, it has been found that the distribution of coating material or wax to the articles to be treated, can be effectively controlled from large quantities to minute quantities, the minimum being in the order of one drop to ten drops per minute for each finger employed according to the adjustment of the fingers about the circumferential surface of the drum 31. The provision of the kerf 33ᵇ in the finger has been found to be important to the flow of the coating material down the finger in a manner that can be controlled; and, in this connection, it has been found that the width of the kerf is dependent on the viscosity and other physical properties of the liquid material to be applied. For instance, and by way of examples, for a liquid coating, having Saybolt viscosity units, in seconds, of about 213.5 sec. at 90° F. and of about 130 sec. at 100° F., it has been found that a kerf between .040 and .020—with an optimum of about .025—of an inch in a finger strip of about ⅛ of an inch in thickness is quite satisfactory for the former viscosity but, for the higher temperatures of 100° F. or more, the kerf may be about .010 to .020—with an optimum of about .015—of an inch wide. The usual water-wax emulsions work quite satisfactorily with a kerf of about .025 of an inch in width. However, from conducted tests it appears that coating liquids having a viscosity of about 100 to 200 Saybolt units and a surface tension of about 30 to 40 dynes per centimeter seem to be the optimum physical constants for a liquid to be transferred from the pick-up drum by the drip fingers 33.

The fingers 33 are, preferably, supported in their position by a supporting rod 34 disposed above and parallel with the drum 31 and held in this spaced relation with the drum by a laterally extending arm 35 secured to its ends, said arm being pivotally mounted about the axis of the drum so that the rod may be swung concentrically with respect to the drum. The rod 34 has a plurality of laterally extending pin-like projections or studs 36 at spaced intervals along its length (preferably about one inch apart) and positioned thereon to be received into an opening 33ª in the upper end of each of said fingers 33, whereby the fingers 33 may be quickly and detachably hung from the bar 34 with an intermediate portion thereof contacting the drum tangentially and with its lower end of such length as will extend beyond and outside of the edge 30ª of the tank 30 (see Figures 2 and 4) so that the wax or coating material will drop from the lower ends of the fingers onto an underlying applicator brush 37. The longitudinal slit or kerf 33ᵇ in each finger 33 extends through the opposite flat surfaces of the fingers and, preferably, centrally thereof, and is of a length (see Figures 3 and 5) extending from the lower end of the finger to a point at least coincident with the point of tangency of the finger with the drum 31 in order to effect the proper transfer of the coating material to said finger. The lower extremity of each finger 33 is, preferably, defined by a line oblique to the side edges of the finger.

The applicator brush 37 is disposed below and rearwardly of the tank 30 and extends transversely of and within the housing *h* and is journalled at its opposite ends in journal blocks 38 vertically adjustably mounted, respectively, on the side walls 23 of said housing in order that the applicator brush may be adjusted as to height with respect to the fruit on the conveyor bed 11 to initially bring it into proper contact with the articles on said bed to apply the wax thereon to said articles and to maintain it in such contact.

As shown particularly in Fig. 4, the pick-up drum 31 is rotated in the direction of the arrow thereon or in a counter-clockwise direction, as viewed in said figure, so that an adhering of liquid within the tank or trough 30 is moved upwardly under the fingers 33 between their tangential contact *t* with said drum and the lower or drip-ends of the fingers, a portion of this liquid being transferred to the kerfs in said fingers by capillary attraction and flows down the same by gravity. With this arrangement of the present invention, it has been found that the amount of wax or coating material picked up by or transferred to the fingers 33 from the drum 31 depends upon the thickness of the film on the surface of the drum under said fingers at their point of tangency with said drum; hence the peripheral speed of rotation of said drum must be greater than the rate of speed or tendency of the film on the drum to flow back down the drum and into the tank. This peripheral speed of the drum can be generally controlled, for varying the amount of wax or coating material transferred to said fingers 33 and delivered thereby to the applicator brush 37, by varying the speed of rotation of said drum; and this degree of control ordinarily is sufficient in the case of less viscous coating materials. But, finer regulation or control, of the transfer to and delivery by said finger of the coating material, can be readily and minutely obtained by altering the position of the point of tangency of the fingers 33 on the drum 31. It has been found that, the higher this point of tangency of the fingers 33 on the surface of the drum, a less quantity of wax or coating material is carried to the fingers and, therefore, less wax or coating material is applied to the articles being treated. This finer control is especially useful and applicable when the coating material is of high viscosity, referred to above, and this control is accomplished by manually moving the finger hanger rod 34 about the axis of the drum 31 to vary the position of the point of tangency of the fingers 33. It has been found, also, in actual use, that in obtaining satisfactory results the rake-angle of the fingers 33, with respect to said drum, may be varied between 25° and 45° but, in most instances, would not be less than 30°. The tangential adjustment of the fingers relative to the drum may be maintained by any suitable means such as by a link 49 having one end pivoted, as at 50, to a fixed part of the housing and having an elongated slot 51 in its other end through which extends a stud or bolt 52 carried by the distal end portion of an adjacent support arm 35 for the rod 34, the stud or bolt 52 having thereon a suitable binding nut 53.

It has been found that the kerf 33ᵇ may extend upwardly beyond the point of tangency with the drum and give a good flow of wax from the drip fingers; however, it is the preferred practice to terminate the upper or inner end of the kerf 33ᵇ at the point of tangency of the fingers with the drum, as at *t* in Figures 3 and 4. The drum 31 may be rotated in a reverse direction, than just described and indicated in the drawings, that is, downwardly on the finger side; but this effects less transfer of the wax to the fingers. However, in either case, the drip control is good with the adjustability of the fingers 33 on the surface of the drum 31.

The pick-up drum 31 is driven by a motor 39 through a speed reduction gearing 40, the motor 39 having a variable pitch sheave 41 on its shaft connected by a belt drive 42 with a hand-change pulley 43 of the gearing 40, the out-put side of said gearing 40 having a sprocket chain drive connection 44 with one end of the drum 31 (see Figs. 1, 2 and 3). As shown in the drawing, the motor 39 is carried on an adjustable base 45 mounted upon one end portion of the rear transverse bar 25 of the housing *h*; and the reducing gear 40 is mounted upon a bracket 46 carried on a forward portion of the top edge of the adjacent end-wall of the housing *h* so that the sheave 41 and pulley 43 are in substantial alignment. The motor 39 is adjustable on its base 45 by a screw-adjusting means 47 operable by a crank-handle 48 in order to move the motor toward or away from the reducing gear 40 and cause the belt 42 to vary its position between the spring-loaded sides of the sheave 41 (in a manner well understood in the art), thus varying the speed output of said motor to the pulley 43 and, hence, to the drum 31.

While the variable speed range of the drum may be that which is found desirable or necessary for the treating of articles, in accordance with this invention, with various coating material, it is proposed for the treating of fruits and vegetables, with wax that congeals at temperatures above ordinary room temperature, that the reducing gear 40 and the variable pitch sheave 41 be such that the speed of the drum 31 will be variable from about .01 to 18 R. P. M. depending upon the viscosity of the wax and its surface tension at the time of application, which, in turn, is affected by atmospheric conditions at the time of operation, for all of which compensating speed adjustments may be made. An optimum speed range for the drum of between 0.77 and about 1.15 R. P. M. has been found satisfactory for treating tomatoes and cucumbers; but the speed must be selected by the operator according to the conditions then prevailing.

Since the applicator herein described is particularly adapted for use with coating materials and wax that congeal or solidify at temperatures above normal room-temperature, it is necessary to maintain the fluidity of said material. To this end, the housing *h* is enclosed as much as possible, as by providing a hood *h'* for the housing to cover the tank 30, pick-up drum 31 and fingers 33 and enclosing a heating-means 54; and, also, there is provided immediately below the tank 30, and co-extensive therewith, an enclosed heating chamber 55 in which is disposed a heating means 56 controlled by a thermostat 57 removably extending through an end 24 of the housing *h* into the coating material in said tank 30. The heating means 54 and 56 may be of any desired type but are here shown as conventional electric-light lamps or bulbs as they produce adequate heat and are simple enough to make replacement and maintenance a small problem. The heating means 54 is, preferably, carried on the underside of the hood *h'* to direct the heat therefrom upon the fingers 33, the drum 31 and surface of the coating material in tank 30, as well as upon, at least, a portion of the applicator brush 37. To assist the distribution of heat from the tank heating-chamber 55 throughout the wax or coating material in the tank 30, an elongated inverted-channel member 58 is positioned on the bottom of the tank 30 and has openings 58ᵃ at spaced intervals in the sides thereof, this channel member conducting the heat from the top wall of heating-chamber 55 (which is also the bottom wall of the tank 30) throughout the length of the tank and, thus, reducing the time and energy involved to initially liquify the wax and to maintain its fluid as the wax, itself, is a poor conductor of heat.

As mentioned above, the thermostat 57 controls the heating means 56 through a manual switch 52, in the manner shown in Fig. 8; and, by adjustment of the thermostat 57, the temperature within the tank may be maintained at a desired temperature plus or minus approximately one-half degree. By means of the manual switch 63, the heating means 54 under the hood may be controlled independently of the operation of the thermostat 57, because it has been found that the air currents created by the rotation of the applicator brush 37 tends to cool the fingers 33 as well as to congeal the wax thereon, particularly on cool days, irrespective of the temperature of the wax in the tank 30.

The hood *h'* is hinged to the housing *h*, preferably, at the upper edge of the front wall of the housing, as at *h²*, in order to permit ready access to or adjustment of the fingers 33, to the heating means 54 and to the drum 31 and tank 30. Access to the heating chamber 55 is provided by the hinged door *d* on the front wall 23 of the housing *h*. The wax or coating material may be supplied to the tank 30 through a funnel 59 provided in a side wall of the hood and communicating with the tank through a spout 60 overlying the tank; and the tank may be drained and flushed through a drain pipe 61 extending from the bottom of the exterior of the housing *h*.

After the wax has been applied to the fruits, vegetables or other articles being treated, by the applicator brush 37, it may be desirable to subject them to a further buffing action which tends to spread the wax over the entire surface of the article. In such cases, one or more horizontal buffer brushes 64 are provided to overlie the conveyor bed to contact the articles thereon and are mounted in a frame or hood 65 removably secured, by bolts 66 or other suitable means, to the top side frame pieces 10ᵃ of the frame 10 of the conveyor C rearwardly of the applicator A, as shown particularly in Figs. 1 and 2. The brushes 64 are journalled in vertically adjustable bearings, after the manner of the bearing 38 of the applicator brush 37, to permit proper contact with the articles.

In order to effect satisfactory results, it has been found that the applicator brush 37 and buffer brushes 64, overlying the brushes 11 forming the bed of the conveyor C and acting as polishing brushes, should be of larger diameter than the brushes 11 (in the order of 10 inches and 5 inches in diameter respectively) and should rotate at a faster peripheral speed than brushes 11. While wide variation in these relative speeds appears permissible, satisfactory results are obtained by relative speeds in the order of a ratio of 75:100 R. P. M. with the preferred speed ranging between 120 to 165 R. P. M. for the brushes 11 and 160 to 195 R. P. M. for the applicator brush 37 and buffer brushes 64. The applicator brush 37 and the next adjacent buffer brush 64 may be driven by a sprocket chain 67 which passes over sprocket wheels 68 and 69 thereon, respectively, and over a sprocket 70 on shaft 71 mounted on the frame 10, said shaft 71 being driven through meshing gears 72 and 73 of shafts 18 and 71, respectively, to rotate the brushes 37 and 64 oppositely to the underlying conveyor bed brushes 11. As shown in Figs. 1 and 2, all other buffer brushes are driven from the first buffer brush 64 through a sprocket and chain means 74.

From the above it will be clear that all of the objects of the invention are attained by the apparatus described and shown for the treatment or coating of articles, such as fruits and vegetables, when the articles are placed upon the intake end of the conveyor bed 11 and advanced along the conveyor under the applicator brush 37 which, receiving from the drip-fingers 33 an adjustable and controlled amount of wax, applies the wax to the articles with a wiping action while they are being turned or revolved by the brushes 11; and, while some waxes have a quick spreading action over the surface of the fruit or vegetable, this spreading or distribution of the applied wax is assisted by one or more buffer brushes 64 and, at the same time, the waxed surfaces are being subjected to the polishing action of the brushes 11.

It will also be observed that, in addition to varying the speed of rotation of the drum 31, the control and distribution of the amount of wax, or other coating material, delivered to the applicator brush 37 may be regulated by the number of drip-fingers 33 used in the applicator (which latter is readily accomplished by hanging in required locations the number of fingers desired on the pins 36 of rod 34 or removing certain of said fingers from said rod) and that finer regulation of the dropping of the liquid is obtained by the adjustment of the point of tangential contact $t$ of the fingers 33 on the upwardly moving surface of the pickup member or drum 31.

Having fully described the present invention, and the manner in which it is to be performed, the invention resides in the organization and combination of parts, as well as in the sundry details of construction, herein described; it being understood, however, that the structure herein specifically described is subject to variation and modification which fall within the spirit of the invention and the scope of the appended claims.

That which is claimed, as new, is:

1. A device for supplying and applying a treating liquid to articles conveyed on an underlying treating bed, said device comprising a liquid container, a rotatably and substantially horizontally mounted cylindrical member extending and partially submerged into the liquid in said container, means for rotating said cylindrical member, and a plurality of inclined and spaced finger members disposed and supported with their length tangential relative to said cylinder and each having contact with an unsubmerged surface portion of said cylindrical member and having their lower ends extending beyond said container to deliver the liquid conveyed by said finger members toward said treating-bed.

2. A device, as set forth in claim 1, wherein said finger members each comprise flat relatively thin strip kerfed longitudinal from its lower end to, at least, its point of tangency with said cylindrical member.

3. A device, as set forth in claim 1, wherein there is a supporting means for said finger members disposed above said cylindrical means and mounted for concentrical movement relative to said cylindrical member to raise or lower the point of tangency of fingers on the surface of said cylindrical member, whereby the rake-angle of said finger is changed, and holding means for maintaining said support in its adjusted positions.

4. A device, as set forth in claim 1, characterized by said fingers being adjustable circumferentially of the surface of said cylindrical member to vary their point of tangency on the surface cylindrical member, and holding means for maintaining said fingers in their adjusted positions.

5. A device, as set forth in claim 1, wherein there is a support for said fingers, said support being mounted to move the finger members concentrically relative to said cylindrical member to raise or lower the point of tangency of fingers on the surface of said cylindrical member, whereby the rake-angle of said fingers is changed, and holding means for maintaining said support in its adjusted positions, said finger members being removably attachable to their said support and each comprising a flat relatively thin strip kerfed longitudinal from its lower end to, at least, its point of tangency with said cylindrical member.

6. A device for supplying and applying a treating liquid in selectably controlled amounts to articles on an underlying treating bed, said device comprising a liquid container, a rotatably mounted cylindrical member extending and partially submerged into the liquid in said container, means for rotating said cylindrical member including a variable speed-change mechanism, a hanger-rod disposed above and substantially co-extensive with said cylindrical member and adjustably mounted for movement about the axis of said cylindrical member, a plurality of drip-finger strips removably attached to said rod along its length and having their intermediate portions contacting the unsubmerged portion of said cylindrical member with their free ends extending downwardly and beyond said cylindrical member to direct said liquid toward said treating bed, said finger strips being kerfed from their said free ends upwardly to, at least, their point of contact with said cylindrical member, and means supporting said device in positions over a treating bed.

7. A device, as set forth in claim 6, wherein said hanger-rod has a plurality of pin-like projections laterally extending therefrom at spaced intervals along its length, and each of said fingers has an opening in the upper ends thereof to receive said projections, whereby said fingers may be removably hung in supported position from said rod.

8. A unitary device for supplying and applying a treating liquid in selectably controlled amounts to articles being on an underlying treating bed, said device comprising a support adapted to be disposed over said bed, a liquid container mounted on said support and having a rotatable cylindrical member disposed therein to be partially submerged into the liquid in said container, means for rotating said cylindrical member, a plurality of elongated drip-finger strips disposed lengthwise tangentially relative to an upwardly moving unsubmerged portion of said cylindrical member and spaced along the length of said cylindrical member and having ends extending from the point of tangency in a downwardly inclined direction beyond said container, and means supporting said fingers in position and adjustable to simultaneously raise and lower the point of tangency of said fingers relative to the surface of said cylindrical member, whereby, when the unit is in operative position over said bed, the liquid dropping from said fingers is directed toward said bed.

9. A device, as set forth in claim 1, characterized by a housing enclosing said liquid container, said cylindrical member and fingers, and controllable heating means within said housing.

10. A device, as set forth in claim 1, characterized by a housing enclosing, at least, said liquid container, said cylindrical member and said fingers, a heating means within said housing positioned to heat the liquid in said container, a thermostat in said container operatively connected with said heating means to control the latter, said housing including a hood portion openable and closable over said container, said cylindrical means and said fingers, and a controllable heating means under said hood.

11. In an article coating apparatus, a device for supplying a treating liquid in selectably controlled amounts to an applicator contactable with articles being advanced over a treating bed, said device comprising a supporting frame adapted to be disposed over said bed, a liquid container mounted on said supporting frame to lie transversely of said bed, a cylindrical member rotatably mounted on said frame to lie transversely of said bed and extending and partially submerged into the liquid in said container, means for rotating said cylindrical member, a hanger-rod disposed above and substantially co-extensive with said cylindrical member and mounted for adjustable movement about the axis of said cylindrical member, a plurality of drip-finger strips removably attachable to said rod and disposed tangentially relative to the unsubmerged portion of said cylindrical member along the length of the latter and with their free end extending downwardly and beyond said cylindrical member and said container, said finger strips being kerfed from their said free ends upwardly to, at least, their point of tangency with said cylindrical member, whereby the liquid dropping from said fingers is delivered to an applicator, and holding means for maintaining said hanger-rod in adjusted positions, whereby the point of tangential contact of said fingers may be varied on the surface of said cylinder to control the amount of liquid dropped.

12. A device for supplying liquid in selectably controlled amounts to articles to be treated, said device comprising an upwardly movable arcuate surface adapted to carry thereon a film of liquid, a plurality of elongated drip-fingers disposed substantially longitudinally in the direction of movement of said upwardly moving surface and having an intermediate portion thereof in contact with said upwardly moving arcuate surface their lower ends extending in a downwardly direction therefrom to convey liquid from said surface, and mounting means at the upper ends of said fingers for maintaining said fingers in tangential contact relative to said arcuate surface.

13. A device for supplying liquid in selectably controlled amounts to articles to be treated, said device comprising a surface movable upwardly in an arcuate path above the horizontal and adapted to carry thereon a film of liquid, a plurality of elongated drip-fingers arranged tangentially of said upwardly moving surface with their lower ends extending in an outwardly and downwardly inclined direction relative to said surface, said fingers being adjustable circumferentially of said surface to vary their point of tangency on said surface, and holding means for maintaining said fingers in their adjusted positions.

14. A device for supplying liquid in selectably controlled amounts to articles to be treated, said device comprising a surface movable upwardly in an arcuate path above the horizontal and adapted to carry thereon a film of liquid, a plurality of elongated drip-fingers arranged tangentially of said upwardly moving surface with their lower ends extending in an outwardly and downwardly inclined direction relative to said surface, said fingers being adjustable circumferentially of said surface to vary their point of tangency on said surface, and holding means for maintaining said fingers in their adjusted positions, said fingers being kerfed from their lower ends upwardly to, at least, their point of tangency with said surface.

15. A device as set forth in claim 8 wherein the supporting member is provided with vertically adjustable feet elements adapted to rest on the supporting frame of said bed, whereby a normal level position of said device may be maintained irrespective of the position of said bed.

References Cited in the file of this patent
UNITED STATES PATENTS

| | | |
|---|---|---|
| 1,736,759 | Brogden | Nov. 19, 1929 |
| 1,985,843 | Skinner | Dec. 25, 1934 |
| 2,191,366 | Buccicone et al. | Feb. 20, 1940 |
| 2,578,427 | Hussey et al. | Dec. 11, 1951 |
| 2,595,151 | Lockwood | Apr. 29, 1952 |